US011333764B2

(12) United States Patent
Nishita et al.

(10) Patent No.: US 11,333,764 B2
(45) Date of Patent: May 17, 2022

(54) SURVEY SYSTEM

(71) Applicant: TOPCON CORPORATION, Tokyo (JP)

(72) Inventors: Nobuyuki Nishita, Tokyo (JP); You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 441 days.

(21) Appl. No.: 16/255,235

(22) Filed: Jan. 23, 2019

(65) Prior Publication Data

US 2019/0234733 A1   Aug. 1, 2019

(30) Foreign Application Priority Data

Feb. 1, 2018 (JP) .............................. JP2018-016600

(51) Int. Cl.
*G01S 17/66* (2006.01)
*G01C 15/00* (2006.01)
(Continued)

(52) U.S. Cl.
CPC ................ *G01S 17/66* (2013.01); *G01C 3/02* (2013.01); *G01C 11/025* (2013.01); *G01C 11/18* (2013.01);
(Continued)

(58) Field of Classification Search
CPC .......... G01S 17/66; G01S 17/42; G01S 17/87; G01S 17/89; G01S 17/894; G01C 3/02;
(Continued)

(56) References Cited

U.S. PATENT DOCUMENTS

2009/0119050 A1* 5/2009 Hayashi ............... G01C 15/002
702/94
2010/0256940 A1* 10/2010 Ogawa ................... G01S 17/42
702/97
(Continued)

FOREIGN PATENT DOCUMENTS

JP       09-107717 A    4/1997
JP    2017-020972 A    1/2017
(Continued)

*Primary Examiner* — Luke D Ratcliffe
(74) *Attorney, Agent, or Firm* — Roberts Calderon Safran & Cole P.C.

(57) ABSTRACT

The survey system includes a mobile body equipped with a scanner configured to perform scanning by a distance measuring light, a position measuring device configured to measure a position of the scanner, and a posture detecting device configured to detect a posture of the scanner, the posture detecting device includes an imaging unit configured to periodically acquire image data, a 3-axis angular velocity sensor configured to detect 3-axis posture angles of the scanner, and an arithmetic control unit, and the arithmetic control unit is configured to calculate posture information of the scanner by summing photographing-time 3-axis posture angles (SP0, SP1, SPn) of the scanner acquired in each photographing by image analysis of the image data, and 3-axis posture relative displacement angles of the scanner calculated from detection values of the 3-axis angular velocity sensor.

6 Claims, 13 Drawing Sheets

(51) Int. Cl.
*G01C 11/02* (2006.01)
*G01C 3/02* (2006.01)
*G01S 17/89* (2020.01)
*G01C 11/18* (2006.01)
*G01S 17/42* (2006.01)
*B64D 43/00* (2006.01)
*G01S 17/87* (2020.01)

(52) U.S. Cl.
CPC ............ *G01C 15/006* (2013.01); *G01S 17/42* (2013.01); *G01S 17/87* (2013.01); *G01S 17/89* (2013.01); *B64D 43/00* (2013.01)

(58) Field of Classification Search
CPC ........ G01C 3/08; G01C 11/025; G01C 11/18; G01C 15/006; B64D 43/00
See application file for complete search history.

(56) References Cited

U.S. PATENT DOCUMENTS

| 2015/0254861 | A1* | 9/2015 | Chornenky | H04M 1/0264 348/135 |
| 2016/0217582 | A1 | 7/2016 | Sasaki et al. | |
| 2016/0238708 | A1* | 8/2016 | Ohtomo | G01C 9/06 |

FOREIGN PATENT DOCUMENTS

| JP | 2017-179701 A | 10/2017 | |
| JP | 2017-211265 A * | 11/2017 | ............. G01C 15/00 |

* cited by examiner

SURVEY SYSTEM

TECHNICAL FIELD

The present invention relates to a survey system that acquires three-dimensional data of a survey target.

BACKGROUND ART

In recent years, three-dimensional surveys are frequently performed at survey sites. For example, paragraphs [0033] and [0051] of Patent Literature 1 disclose, as second and third embodiments, a survey system that acquires three-dimensional coordinate point group data of a survey target by scanning with a scanner equipped in a mobile body, identifies a position of the scanner by tracking a prism of the mobile body by a surveying instrument, identifies a posture of the scanner by an IMU (inertial measurement unit) equipped in the mobile body or by image analysis through camera photography, and corrects the three-dimensional coordinate point group data obtained by scanning by the position and posture data of the scanner so as to be improved in accuracy.

CITATION LIST

Patent Literature

[Patent Literature 1] Japanese Patent Application No. 2017-179701

SUMMARY OF THE INVENTION

Technical Problem

As the posture of the scanner to be acquired by image analysis in the third embodiment of Patent Literature 1, even if a posture at each photographing time with the camera can be acquired, a posture in an interval between photographing times in which photographing is not performed cannot be acquired. Because the scanner scans three-dimensional coordinate data at intervals shorter than those of photographing, if posture data of the scanner in the interval between photographing times can be obtained, more accurate three-dimensional coordinate point group data of the survey target can be obtained by correction.

The IMU adopted in the second embodiment of Patent Literature 1 is equipped with not only a 3-axis gyroscope but also various sensors such as an acceleration sensor and a magnetic sensor, and accordingly, can precisely detect a posture of the scanner equipped in the mobile body, however, because of the high cost, in the case where the mobile body is formed as an air vehicle, breakage caused by a crash becomes a big problem.

An object of the present invention is to provide, at low cost, a survey system capable of obtaining a posture of a scanner in greater detail when acquiring three-dimensional coordinate point group data of a survey target.

Solution to Problem

In order to solve the above-described problem, a survey system according to an aspect of the present invention includes a mobile body equipped with a scanner configured to scan a survey target by a distance measuring light, a position measuring device configured to measure a position of the scanner, and a posture detecting device configured to detect a posture of the scanner, wherein the posture detecting device includes an imaging unit configured to acquire image data by periodic photography, a 3-axis angular velocity sensor configured to detect 3-axis posture angles of the scanner, and an arithmetic control unit, and the arithmetic control unit is configured to calculate posture information of the scanner by summing photographing-time 3-axis posture angles of the scanner acquired in each photographing by image analysis of the image data, and 3-axis posture relative displacement angles of the scanner calculated from detection values of the 3-axis angular velocity sensor.

In the aspect described above, it is also preferable that the arithmetic control unit is configured to calculate the 3-axis posture relative displacement angles by subtracting 3-axis preceding posture angles detected by the 3-axis angular velocity sensor at each photographing time by the imaging unit from 3-axis following posture angles detected by the 3-axis angular velocity sensor in an interval between photographing times by the imaging unit.

In the aspect described above, it is also preferable that the 3-axis angular velocity sensor is configured to detect the 3-axis following posture angles at a scanning time of the scanner and detect the 3-axis preceding posture angles at the latest photographing time before the scanning time.

In the aspect described above, it is also preferable that the mobile body has a prism, and the position measuring device is a surveying instrument configured to perform a distance measurement and an angle measurement by tracking the prism.

In the aspect described above, it is also preferable that the position measuring device is a GNSS (Global Navigation Satellite System) device provided in the mobile body.

In the aspect described above, it is also preferable that the position measuring device is an image analyzer including an imaging unit provided in the mobile body.

In the aspect described above, it is also preferable that the scanner includes a light emitting unit configured to emit a distance measuring light, a light receiving unit configured to receive a reflected distance measuring light, a distance measuring unit configured to perform a distance measurement based on an output of the light receiving unit, a first optical axis deflecting unit located on an optical axis of the distance measuring light and configured to deflect the distance measuring light, a second optical axis deflecting unit located on a light receiving optical axis of the reflected distance measuring light and configured to deflect the reflected distance measuring light at the same deflection angle in the same direction as those of the first optical axis deflecting unit, and an emitting direction detecting unit configured to detect a deflection angle and direction of the first optical axis deflecting unit and the second optical axis deflecting unit.

Effects of the Invention

According to the survey system of the present invention, postures of the scanner not only at photographing times but also in an interval between photographing times can be acquired in detail from a posture of the scanner at a photographing time obtained by image processing and analysis even without adopting an expensive IMU, and from variation values of 3-axis posture angles of the scanner obtained with an inexpensive 3-axis angular velocity sensor, and by correcting three-dimensional coordinate point group data obtained by scanning along with a position of the scanner obtained with the position measuring device, a product of a three-dimensional survey can be highly accurately obtained.

According to the survey system of the present invention, 3-axis posture relative displacement angles being variation values of 3-axis posture angles of the scanner are easily obtained from a relative displacement obtained by subtracting 3-axis preceding posture angles detected at a photographing time from 3-axis following posture angles detected in an interval between photographing times by the 3-axis angular velocity sensor, and 3-axis absolute posture angles of the scanner are highly accurately obtained by adding the variation values of 3-axis posture angles detected by the 3-axis angular velocity sensor to 3-axis posture angles of the scanner obtained by image analysis.

According to the survey system of the present invention, a posture of the scanner at each scanning time can be acquired in detail by obtaining 3-axis posture relative displacement angles of the scanner by subtracting 3-axis preceding posture angles detected at the latest photographing time (by the imaging unit) before a scanning time of the scanner from 3-axis following posture angles detected at the scanning time, so that a posture of the scanner in each scanning can be highly accurately obtained.

According to the survey system of the present invention, a product of a three-dimensional survey can be highly accurately obtained by correcting three-dimensional coordinate point group data obtained by scanning with the scanner by a position of the scanner obtained by the position measuring device consisting of a surveying instrument, a GNSS device, or an image analyzer, and a posture of the scanner detected by the posture detecting device.

According to the survey system of the present invention, scanning can be performed by freely deflecting a distance measuring light by the scanner, so that a product of a three-dimensional survey, consisting of three-dimensional coordinate point group data having a high degree of freedom, can be highly accurately obtained.

BRIEF DESCRIPTION OF THE DRAWINGS

FIG. 2A is a side view of the same device, and FIG. 2B is a bottom view of the same device.

FIG. 7A is a side view of the same system, and FIG. 7B is a bottom view of the same system.

FIG. 10A is a side view of the same system, and FIG. 10B is a bottom view of the same system.

DESCRIPTION OF EMBODIMENTS

Next, preferred embodiments of the present invention are described with reference to the drawings.

First Embodiment

Figure 1:
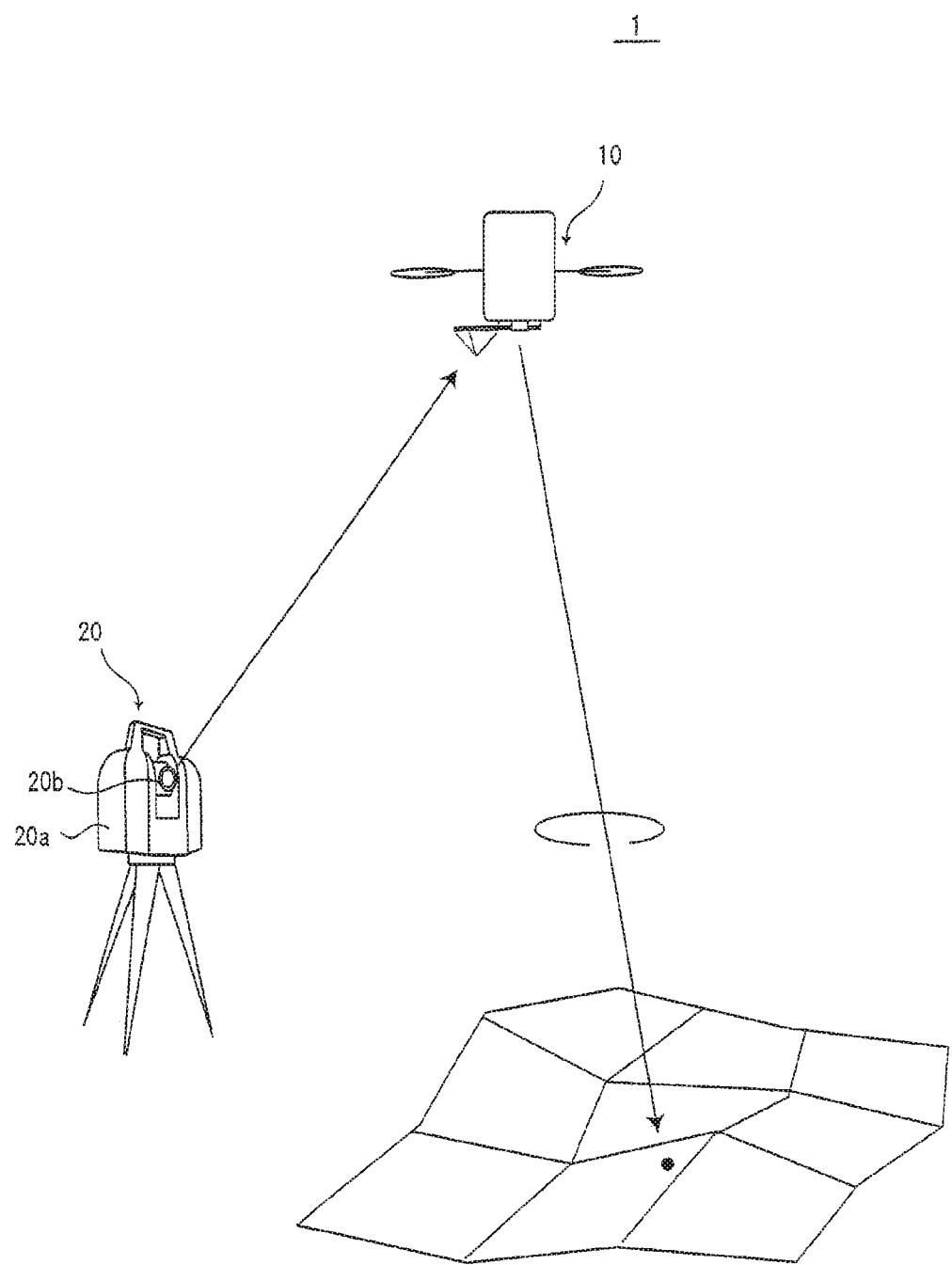
FIG. 1 is an entire configuration view of a survey system according to a first embodiment.
Figure 2A:
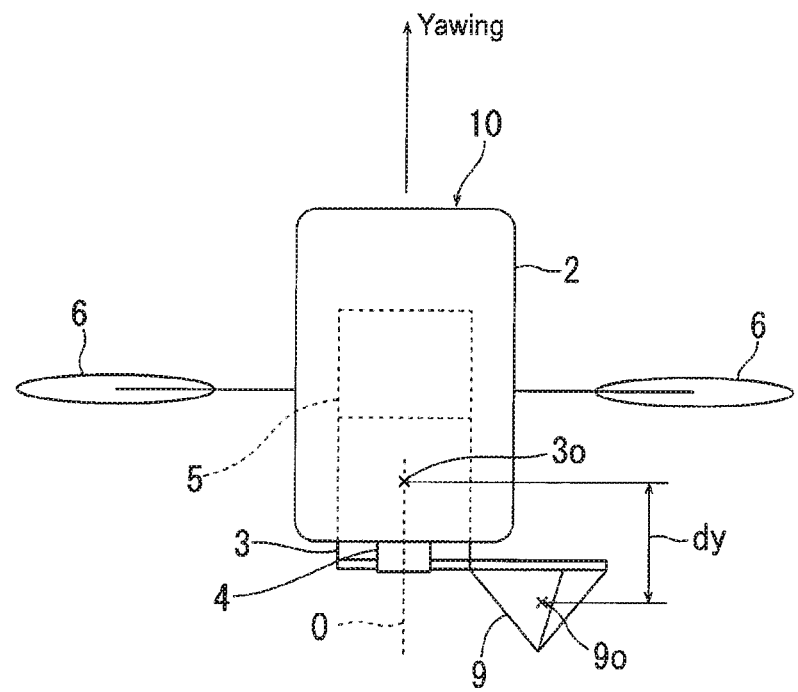
FIGS. 2A and 2B are configuration views of a surveying moving device according to the first embodiment.
Figure 2B:
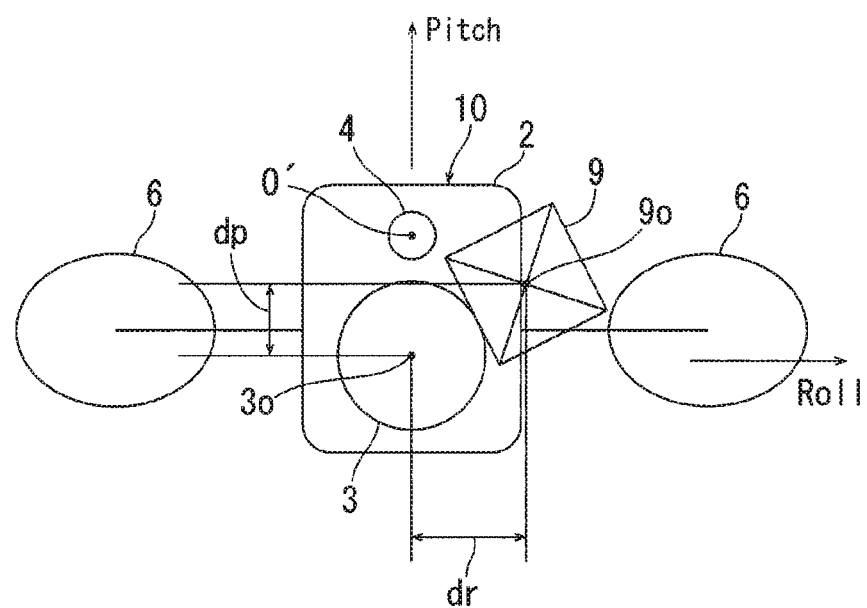

FIG. 1 is an entire configuration view of a survey system 1 according to a first embodiment, FIG. 2A is a side view of a surveying moving device 10 of the survey system 1, and FIG. 2B is a bottom view of the surveying moving device 10 of the survey system 1. The survey system 1 consists of the surveying moving device 10 and a surveying instrument 20.

As illustrated in FIG. 2A and FIG. 2B, the surveying moving device 10 includes a mobile body 2, a scanner 3, an imaging unit 4, a 3-axis angular velocity sensor 5, and a prism 9 that becomes a target of the surveying instrument 20. In the present embodiment, the prism 9 is fixed to a lateral side of a tip end of a lens portion of the scanner 3. The fixation position of the prism 9 may be a position other than this, however, deviations (dr, dp, and dy) in roll axis, pitch axis, and yaw axis directions between a measurement reference point 3o of the scanner and an optical center (optical reflection point) 9o of the prism 9 are made known in advance of attachment of the prism 9.

The mobile body 2 is a UAV (Unmanned Air Vehicle) capable of autonomous flying. The mobile body 2 includes a plurality of propellers 6 extending radially and a flying unit not illustrated in the drawings, and can fly along a flight path determined in advance, and can freely fly by being remotely controlled.

The scanner 3 transmits a laser distance measuring light to measure a three-dimensional position of each scanning point of a survey target. In the scanner 3, at each of the light emitting unit and the light receiving unit, an optical axis deflecting unit including Risley prisms is located, and can deflect the distance measuring light in an arbitrary direction. A reference optical axis O of the scanner 3 is provided so as to turn vertically downward when the mobile body 2 is in a horizontal posture (refer to FIG. 2A). The reference sign 3o denotes a measurement reference point of the scanner 3 on the reference optical axis O.

Figure 3:
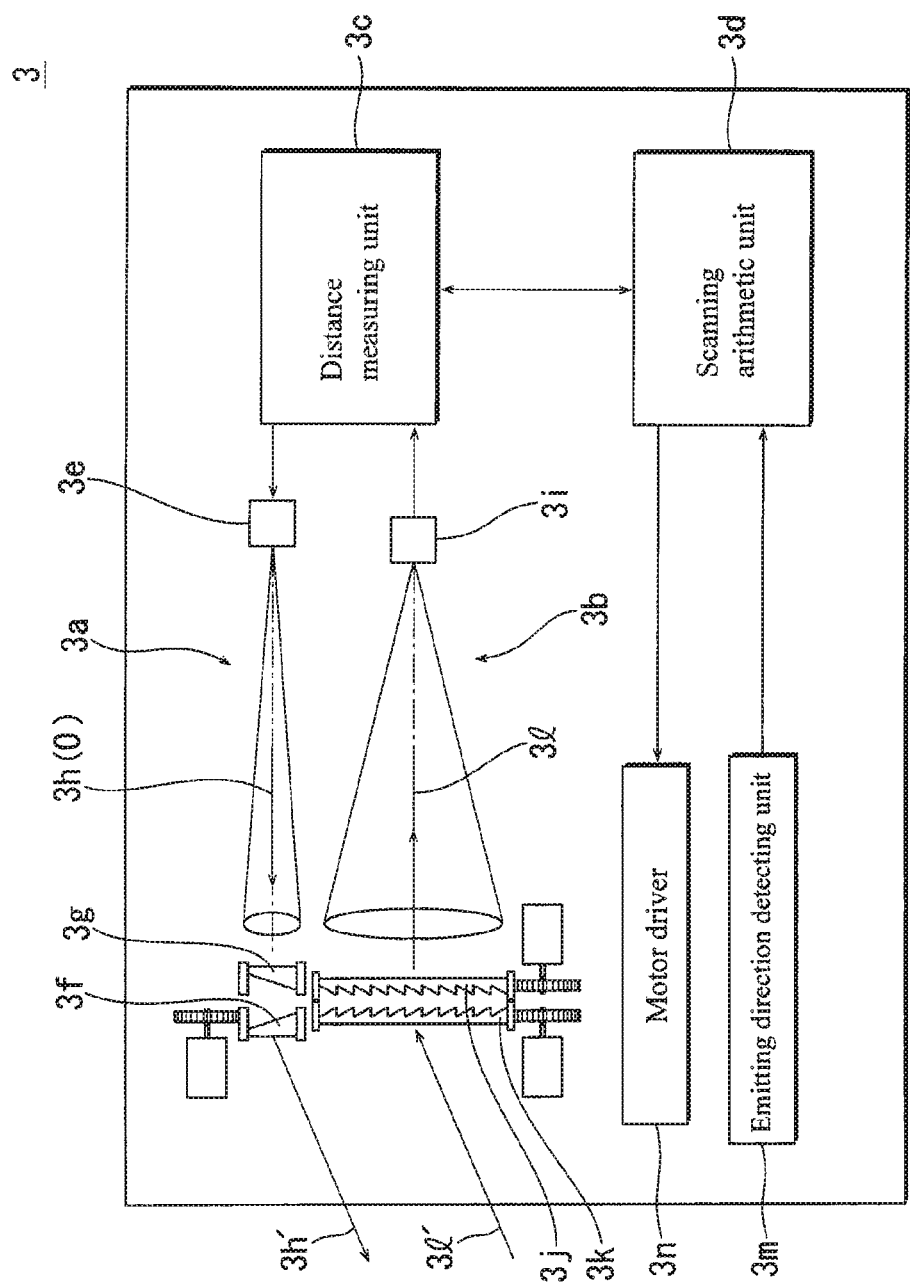
FIG. 3 is a configuration block diagram of a Fresnel scanner equipped in the survey system according to the first embodiment.

FIG. 3 is a configuration block diagram of the scanner 3. The scanner 3 includes an emitting unit 3a, a light receiving unit 3b, a distance measuring unit 3c, a scanning arithmetic unit 3d, and an emitting direction detecting unit 3m. The emitting unit 3a includes a light emitting element 3e and a pair of Risley prisms 3f and 3g. From the light emitting element 3e, a distance measuring light 3h' is emitted. The Risley prisms 3f and 3g face each other while centering on an optical axis 3h of the distance measuring light, and can be rotated independently of each other by a motor driver 3n. The Risley prisms 3f and 3g function as a first optical axis deflecting unit to deflect the distance measuring light 3h'. The light receiving unit 3b includes a light receiving element 3i and a pair of Fresnel prisms 3j and 3k including a plurality of Risley prisms continuous with each other. The light receiving element 3*i* receives a reflected distance measuring light from a scanning point. The Fresnel prisms 3*j* and 3*k* face each other while centering on an optical axis 3*l* of the reflected measuring light 3*l'*, and can be rotated independently of each other by the motor driver 3*n*. The Fresnel prisms 3*j* and 3*k* function as a second optical axis deflecting unit to deflect the reflected distance measuring light 3*l'*. In FIG. 3, the first optical axis deflecting unit is located on an emission side, and the second optical axis deflecting unit is located on a light receiving side, however, a configuration in which an optical axis deflecting unit is shared by the emission side and the light receiving side may be adopted.

The distance measuring unit 3*c* transmits a distance measuring light 3*h'*, and acquires a distance to each scanning point by measuring a round-trip time of the distance measuring light 3*h'* based on a light receiving signal of the light receiving element 3*i*. The emitting direction detecting unit 3*m* counts drive pulses input to the motor driver 3*n* or uses an encoder to detect rotation directions, rotation amounts, and rotation speeds of the Risley prisms 3*f* and 3*g*. By passing through the Risley prisms 3*f* and 3*g*, the distance measuring light 3*h'* is deflected in an arbitrary direction. The scanning arithmetic unit 3*d* obtains refractive indexes and rotation angles of the Risley prisms 3*f* and 3*g* from the emitting direction detecting unit 3*m*, and based on these, calculates a deflection angle and direction of the distance measuring light 3*h'*.

The emitting direction detecting unit 3*m* detects rotation directions, rotation amounts, and rotation speeds of the Fresnel prisms 3*j* and 3*k* in the same manner. The scanning arithmetic unit 3*d* performs control so that the deflection angles and directions of the Fresnel prisms 3*j* and 3*k* are always the same as those of the Risley prisms 3*f* and 3*g*. By passing through the Fresnel prisms 3*j* and 3*k*, the reflected distance measuring light 3*l'* is deflected so as to match the light receiving optical axis 3*l*.

With the configuration described above, the scanner 3 can arbitrarily deflect the deflection angle and direction of the distance measuring light 3*h'* in accordance with a combination of rotational positions of the Risley prisms 3*f* and 3*g*, and acquire three-dimensional coordinate point group data of scanning points. By integrally rotating the Risley prisms 3*f* and 3*g* in a state where the positional relationship between the Risley prisms 3*f* and 3*g* is fixed, the distance measuring light 3*h'* can be scanned, for example, in a circular form around a deflection reference axis O' (refer to FIG. 4 described below).

The imaging unit 4 illustrated in FIG. 2A and FIG. 2B is a camera including an image sensor such as a CCD sensor or a CMOS sensor, and a position of each pixel on an imaging element can be identified. For example, a position of each pixel on an image is identified by a coordinate system using an imaging optical axis O' of the imaging unit 4 as an origin. The imaging unit 4 is incorporated in the mobile body 2, and is fixed so as to be displaced from the mechanism of the scanner 3. The imaging optical axis O' of the imaging unit 4 is set so as to turn vertically downward when the mobile body 2 is in a horizontal posture.

The 3-axis angular velocity sensor 5 illustrated in FIG. 2A consists of a 3-axis gyro sensor fixed together with the scanner 3 integrally to the mobile body 2, and acquires 3-axis posture angles (a roll angle, a pitch angle, and a yaw angle) at a predetermined time from angular velocities in the 3-axis directions of the scanner 3. In the present embodiment, the imaging unit 4 and the 3-axis angular velocity sensor 5 function as a posture detecting device 13 that detects a posture of the scanner 3 in cooperation with an arithmetic control unit 7 described below.

The surveying instrument 20 illustrated in FIG. 1 is a total station capable of automatically tracking a target, and includes a main body 20*a* that rotates horizontally, and a telescope 20*b* provided vertically rotatably on the main body 20*a*. The surveying instrument 20 is mounted at a known point by using a tripod. In the present embodiment, the surveying instrument 20 functions as a position measuring device to measure a position of the scanner 3.

Figure 4:
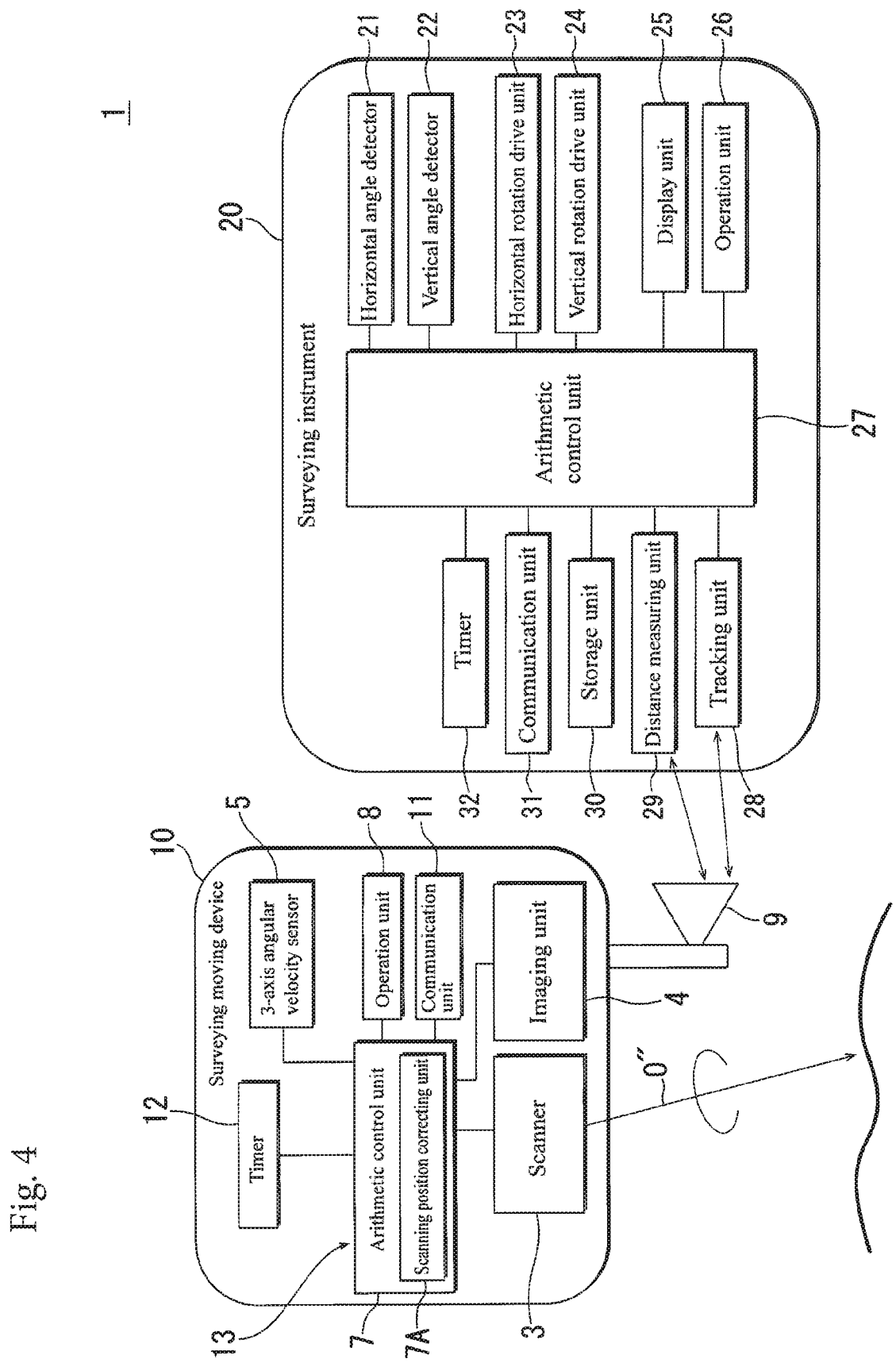
FIG. 4 is a control block diagram of the survey system according to the first embodiment.

FIG. 4 is a control block diagram of the survey system 1. The surveying moving device 10 side includes the scanner 3, the imaging unit 4, the 3-axis angular velocity sensor 5, the arithmetic control unit 7, an operation unit 8, a communication unit 11, and a timer 12. From the operation unit 8, various operation commands and settings can be input to the arithmetic control unit 7.

The arithmetic control unit 7 is, for example, a microcontroller including, for example, a CPU, a ROM, and a RAM, etc., mounted on an integrated circuit. The arithmetic control unit 7 controls a flying unit not illustrated in the drawings, acquires three-dimensional coordinate point group data (distances and angles to scanning points) of a survey target from the scanner 3, calculates posture information of the scanner 3 from image data in each photographing acquired by photographing the survey target, etc., by the imaging unit 4 and 3-axis posture angles of the scanner 3 respectively detected at each photographing time and at a time in an interval between photographing times by the 3-axis angular velocity sensor 5, and acquires positional information of the scanner 3 from the surveying instrument 20. The arithmetic control unit 7 acquires a system time from the timer 12 at the timing of outputting a light transmission signal of the scanner 3, and provides the time to the three-dimensional coordinate point group data and the posture information and the positional information of the scanner 3.

Detection of a posture of the scanner 3 by the posture detecting device 13 is performed as follows (refer to FIG. 5). First, the imaging unit 4 periodically photographs a survey target at predetermined intervals of, for example, 2 seconds (the photographing intervals are not limited to 2 seconds), and the scanner 3 acquires three-dimensional coordinate point group data of the survey target at scanning intervals much shorter than the photographing intervals of the imaging unit 4. By performing image analysis of the periodically acquired image data by SfM (Structure from Motion), etc., the arithmetic control unit 7 calculates photographing-time 3-axis posture angles (a roll angle, a pitch angle, and a yaw angle) representing a posture of the scanner 3 at each photographing time (P1, P2 . . . ), calculates 3-axis posture relative displacement angles of the scanner 3 from differences between 3-axis preceding posture angles of the scanner 3 detected at each photographing time (P1, P2 . . . ) of the imaging unit 4 and 3-axis following posture angles of the scanner 3 detected in an interval between photographing times (between P1 and P2) of the imaging unit 4 by the 3-axis angular velocity sensor 5, and lastly adding, to the photographing-time 3-axis posture angles at a photographing time, the 3-axis posture relative displacement angles being relative variations in the 3-axis directions of the scanner 3 from the photographing time so as to calculate photographing interval 3-axis posture angles (posture information in an interval between photographing times) of the scanner 3. In this regard, 3-axis posture angles of the scanner 3 are represented by displacement angles in the 3-axis directions based on a reference position of the scanner when the mobile body 3 to which the scanner 3 is fixed is in a horizontal posture and the reference optical axis O of the scanner 3 turns vertically downward. The imaging unit 4 is fixed integrally with the scanner 3 in the mobile body 2, so that a posture of the imaging unit 4 can be regarded as a posture of the scanner 3.

Figure 5:
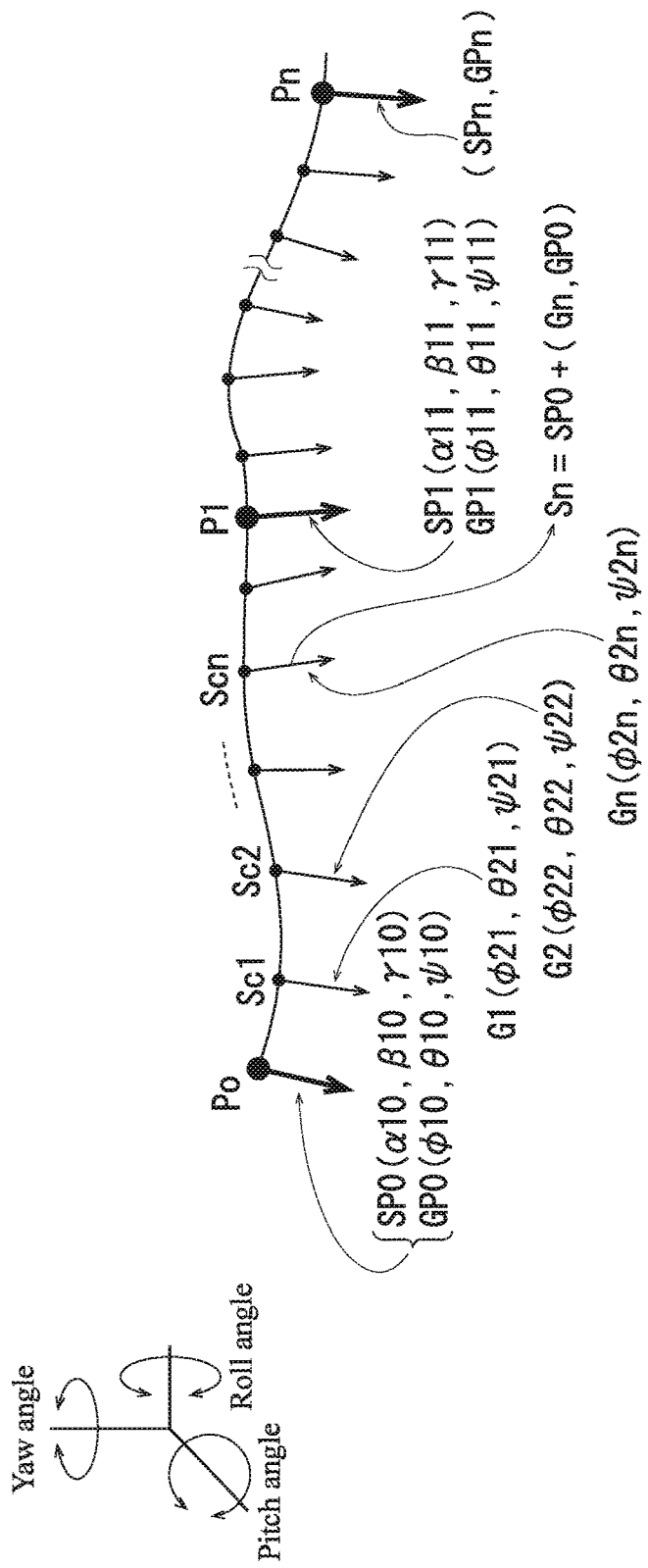
FIG. 5 is an explanatory view of a posture detecting method by a posture detecting device.

Specifically, in FIG. 5, when photographing-time 3-axis posture angles (a roll angle, a pitch angle, and a yaw angle) calculated from image analysis at photographing times P0, P1 . . . Pn of photography performed in sequence by the imaging unit 4 are defined as SP0 ($\alpha$10, $\beta$10, $\gamma$10), SP1 ($\alpha$11, $\beta$11, $\gamma$11) . . . SPn, respectively, 3-axis preceding posture angles detected by the 3-axis angular velocity sensor 5 at photographing times P0, P1 . . . Pn are defined as GP0 ($\Phi$10, $\theta$10, $\psi$10), GP1 ($\Phi$11, $\theta$11, $\psi$11) . . . GPn, respectively, and 3-axis following posture angles of the scanner 3 detected by the 3-axis angular velocity sensor 5 at respective scanning times Sc1, Sc2 . . . Scn of scanning performed by the scanner 3 at even intervals between photographing times P1 and P2 are defined as G1 ($\Phi$21, $\theta$21, $\psi$21), G2 ($\Phi$22, $\theta$22, $\psi$22) . . . Gn ($\Phi$2n, $\theta$2n, $\psi$2n), respectively, 3-axis absolute posture angles Sn ($\Phi$n, $\theta$n, $\psi$n) representing a posture of the scanner 3 at each of the scanning times Sc1, Sc2, Sc3 . . . Scn in an interval between photographing times P1 and P2 are calculated by, for example, "3-axis posture angles Sn ($\Phi$n, $\theta$n, $\psi$n)=posture angles SP0 ($\alpha$10, $\beta$10, $\gamma$10) at the latest photographing time before the scanning time+3-axis posture relative displacement angles=SP0 ($\alpha$10, $\beta$10, $\gamma$10)+{3-axis following posture angles Gn ($\Phi$2n, $\theta$2n, $\psi$2n)−3-axis preceding posture angles GP0 ($\Phi$10, $\theta$10, $\psi$10)}."

According to the survey system 1, by adding, to photographing-time posture angles of the scanner 3 obtained by image analysis in the imaging unit, 3-axis posture relative displacement angles of the scanner 3 from the photographing time, a posture of the scanner 3 at each scanning time in an interval between photographing times of the imaging unit 4 which cannot be obtained only by the image analysis can be accurately acquired, and by obtaining the 3-axis posture displacement angles of the scanner 3 from the photographing time from relative displacement amounts of the 3-axis angular velocity sensor 5 consisting of an inexpensive 3-axis gyro sensor, 3-axis displacement angles of the scanner 3 from the photographing time can be highly accurately obtained even with the inexpensive 3-axis gyro sensor that is low in the accuracy of calculation of absolute displacement angles. In this regard, a detection time of 3-axis following posture angles of the scanner 3 by the 3-axis angular velocity sensor 5 is desirably synchronized with a scanning time from the viewpoint of detecting a posture at a scanning time of the scanner 3, however, it may also possible to set a detection time at a time other than scanning times to determine a posture of the scanner 3 at a time other than scanning times.

In the present embodiment, values of 3-axis following posture angles G1, G2 . . . Gn obtained by the 3-axis angular velocity sensor 5 may be multiplied by a predetermined correction coefficient in order to avoid a problem in which an error occurs between photographing-time posture angles of the scanner 3 obtained only by image analysis at P1 and 3-axis posture angles of the scanner 3 at P1 obtained by adding 3-axis posture relative displacement angles obtained by the 3-axis angular velocity sensor 5 to photographing-time posture angles obtained by image analysis at P0, and causes discontinuity.

In the control block diagram of the survey system 1 in FIG. 4, the surveying instrument 20 side includes a horizontal angle detector 21, a vertical angle detector 22, a horizontal rotation drive unit 23, a vertical rotation drive unit 24, a display unit 25, an operation unit 26, an arithmetic control unit 27, a tracking unit 28, a distance measuring unit 29, a storage unit 30, a communication unit 31, and a timer 32.

The horizontal rotation drive unit 23 and the vertical rotation drive unit 24 are motors, and are controlled by the arithmetic control unit 27 and respectively drive a horizontal rotary shaft and a vertical rotary shaft. The display unit 25 and the operation unit 26 are interfaces of the surveying instrument 20, and through these, commanding and setting of a survey work and confirmation of a work situation and measurement results can be performed. The horizontal angle detector 21 and the vertical angle detector 22 are absolute encoders or incremental encoders. The horizontal angle detector 21 is provided for the horizontal rotary shaft and detects a rotation angle in the horizontal direction of the main body 20a. The vertical angle detector 22 is provided for the vertical rotary shaft and detects a rotation angle in the vertical direction of the telescope 20b.

The tracking unit 28 includes a tracking light transmission system that emits, as a tracking light, an infrared laser or the like with a wavelength different from that of a distance measuring light, and a tracking light receiving system including an image sensor such as a CCD sensor or a CMOS sensor. The tracking unit 28 acquires a landscape image including a tracking light and a landscape image from which the tracking light is excluded, and transmits both of these images to the arithmetic control unit 27. The arithmetic control unit 27 obtains a center of a target image from a difference between these images, detects a position at which a deviation between the center of the target image and a center of a visual axis of the telescope 20b falls within a certain value as the position of a target, and performs automatic tracking so that the telescope 20b always faces the target.

The distance measuring unit 29 includes a distance measuring light transmission system that emits a distance measuring light such as an infrared laser to a target, and a distance measuring light receiving system that receives a reflected distance measuring light by a photodiode, etc. The distance measuring unit 29 receives a reflected distance measuring light from a target by the distance measuring light receiving system and divides and receives a part of the distance measuring light as an internal reference light, and measures a distance to the target based on a phase difference between the reflected distance measuring light and the internal reference light. In addition, the distance measuring unit measures an angle to the target from detected values of the horizontal angle detector 21 and the vertical angle detector 22.

The arithmetic control unit 27 is, for example, a microcontroller including a CPU, a ROM, and a RAM, etc., mounted on an integrated circuit, and controls the rotation drive units 23 and 24 and controls the distance measuring unit 29 and the tracking unit 28. The arithmetic control unit acquires a system time from the timer 32 at the timing of outputting a light transmission signal of the distance measuring unit 29, and provides the time to the distance measurement and angle measurement values. The storage unit 30 is, for example, a hard disk drive, and stores various programs for the arithmetic control described above. A target position (distance and angle) acquired by the distance measuring unit 29 is stored together with time information in the storage unit 30. The communication unit 31 can make wireless communication with the communication unit 11 of the surveying moving device 10 side, and transmits the target position stored in the storage unit 30 to the surveying moving device 10 under control of the arithmetic control unit 27.

The scanning position correcting unit 7A corrects a three-dimensional position obtained by the scanner 3 by a position of the scanner 3 obtained as a target of the surveying instrument 20 and a posture of the scanner 3 obtained by the posture detecting device 13. This will be described in detail along with an operation flow described below.

Figure 6:
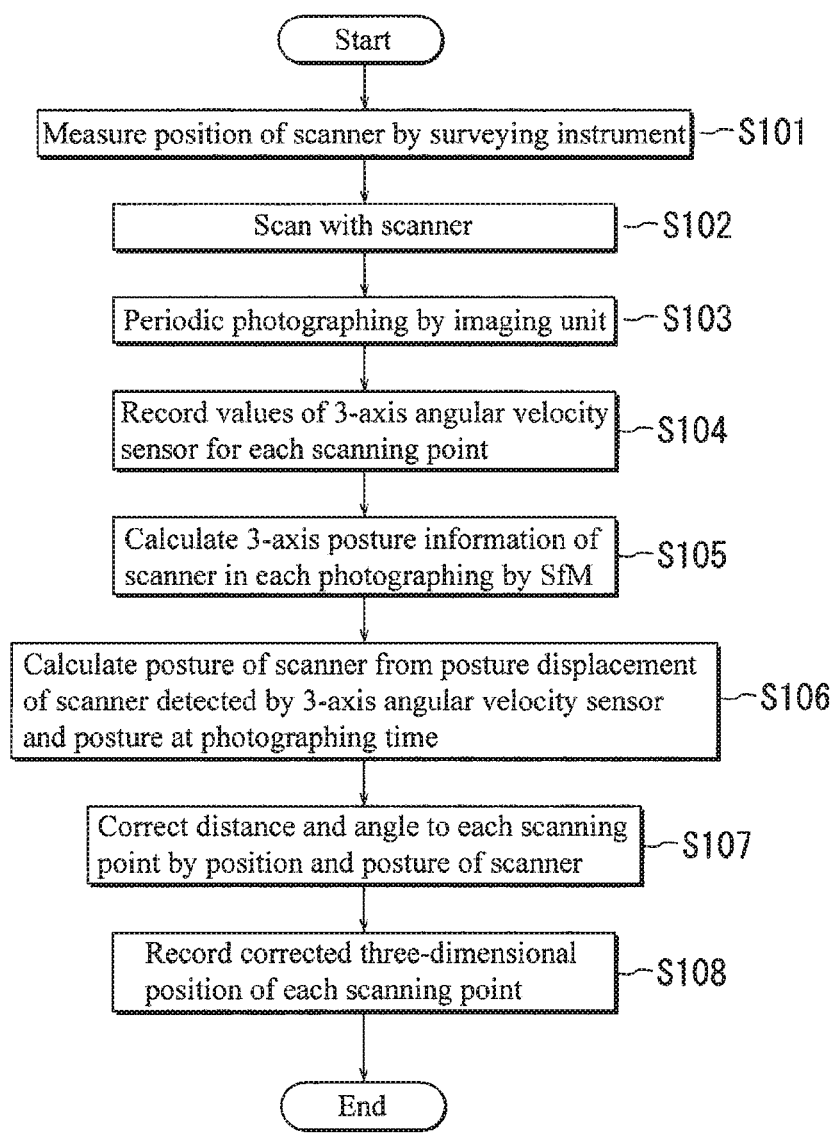
FIG. 6 is an operation flowchart of the survey system according to the first embodiment.

Referring to FIG. 6, an operation flow of the survey system 1 is described.

First, in Step S101, the surveying instrument 20 starts automatic tracking of the prism 9 of the surveying moving device 10, and measures a distance and an angle to an automatically tracked position by the distance measuring unit 29 to measure a three-dimensional position (absolute coordinates) of the prism 9. The surveying instrument 20 transmits the three-dimensional positional information of the prism 9 to the surveying moving device 10.

Next, in Step S102, in parallel with Step S101, the surveying moving device 10 performs a distance measurement and an angle measurement by the scanner 3 to measure three-dimensional positions of scanning points of the survey target.

Next, in Step S103, in parallel with Steps S101 and S102, the surveying moving device 10 acquires a plurality of image data by performing periodic photography at predetermined intervals by the imaging unit 4.

Next, in Step S104, in parallel with Steps S101 to S103, the moving device 10 detects 3-axis posture angles (a roll angle, a pitch angle, and a yaw angle) of the scanner 3 for each scanning point by the 3-axis angular velocity sensor 5.

Next, in Step S105, the arithmetic control unit 7 functioning as the posture detecting device 13 of the surveying moving device 10 performs image analysis of the plurality of image data obtained from the imaging unit 4 in Step S103 by SfM, etc., and calculates absolute posture information (photographing-time 3-axis posture angles) of the scanner 3 in each photographing by the imaging unit 4.

Next, in Step S106, the arithmetic control unit 7 of the surveying moving device 10 calculates rotational displacement of the scanner 3 (3-axis posture relative displacement angles obtained by subtracting 3-axis preceding posture angles at the latest photographing time before a predetermined scanning time from the 3-axis following posture angles at the predetermined scanning time) from 3-axis posture angles (a roll angle, a pitch angle, and a yaw angle) of the scanner 3 for each scanning point obtained from the 3-axis angular velocity sensor 5 in Step S104, and adds the calculated 3-axis posture relative displacement angles to the photographing-time 3-axis posture angles to calculate absolute posture information (3-axis absolute posture angles) of the scanner 3 for each scanning point.

Next, in Step S107, the positional information of the prism 9 obtained from the surveying instrument 20 in Step S101, the three-dimensional coordinate point group data of scanning points obtained from the scanner 3 in Step S102, and the absolute posture information of the scanner 3 obtained by the posture detecting device 13 in Step S106 are associated with each other by time. Then, the scanning position correcting unit 7A corrects the three-dimensional positions of the scanning points obtained in Step S102 by the positional information and the absolute posture information of the scanner.

Specifically, in Step S101, a position of the prism 9 is precisely measured as absolute coordinates by the surveying instrument 20. In Step S106, an inclination (posture) of the scanner 3 is known. Therefore, the scanning position correcting unit 7A corrects the reference optical axis O of the scanner to a posture direction of the scanner, and re-calculates a distance and an angle to each scanning point measured by the scanner 3 by setting coordinates moved by the respective deviations (dr, dp, dy) from the coordinates of the prism 9 as a measurement reference point 3o of the scanner.

Last, in Step S108, the surveying moving device stores the three-dimensional positions (absolute coordinates) of the scanning points corrected in Step S107, and ends the operation.

Second Embodiment

Figure 7A:
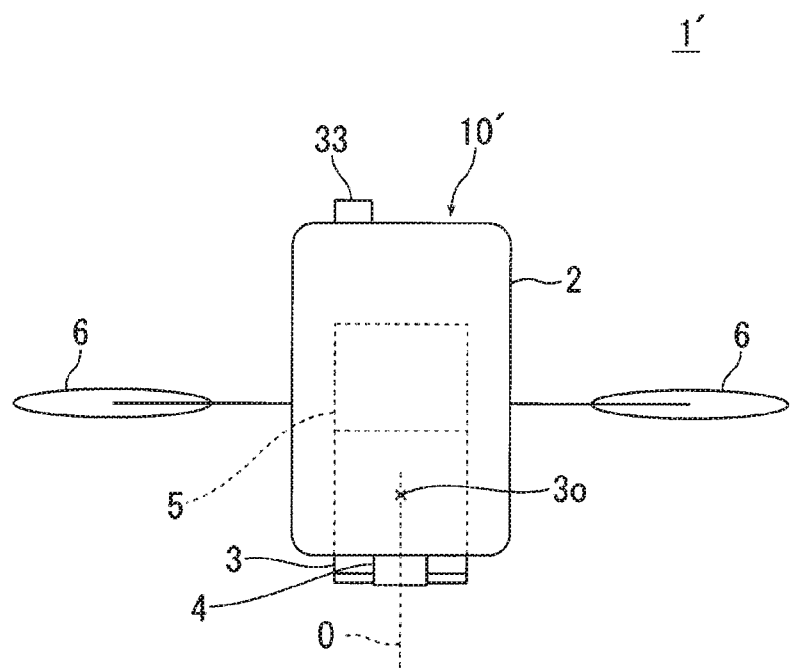
FIGS. 7A and 7B are entire configuration views of a survey system according to a second embodiment.
Figure 7B:
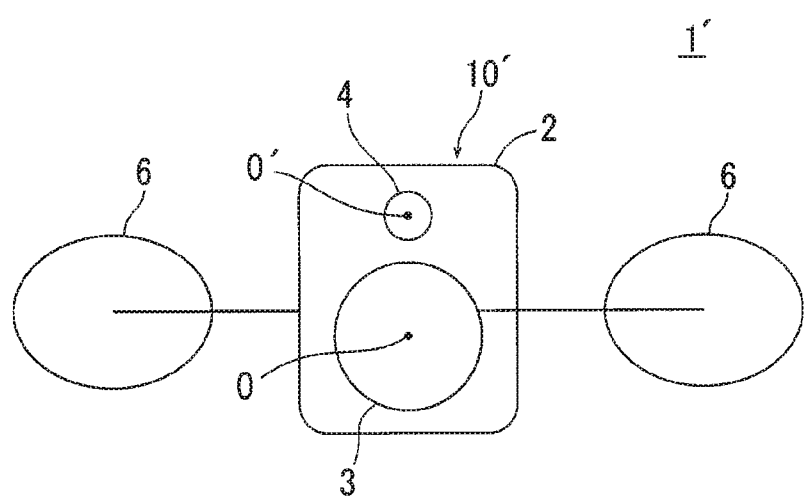

Hereinafter, for the same components as in the first embodiment, the same reference signs are used, and description thereof is omitted. FIG. 7 are configuration views of a survey system 1' according to a second embodiment, FIG. 7A is a side view of the survey system 1', and FIG. 7B is a bottom view of the survey system 1'. The survey system 1' is a survey system including, as a position measuring device for the scanner 3, a GPS device 33 that is one of the GNSS (Global Navigation Satellite System) devices in place of the surveying instrument 20. The survey system 1' consists of a surveying moving device 10' including a mobile body 2, a scanner 3, an imaging unit 4, a 3-axis angular velocity sensor 5, and a GPS device 33, and the surveying moving device 10' has the same configuration as that of the surveying moving device 10 illustrated in FIG. 2A and FIG. 2B except that the surveying moving device 10' includes the GPS device 33, and the prism 9, the communication unit 11, and the timer 12 are omitted.

The GPS device 33 is fixed to the mobile body 2, and receives a signal from a GPS satellite and acquires a UTC, a latitude, and a longitude. The GPS device 33 functions as a position measuring device to measure a position of the scanner 3.

Figure 8:
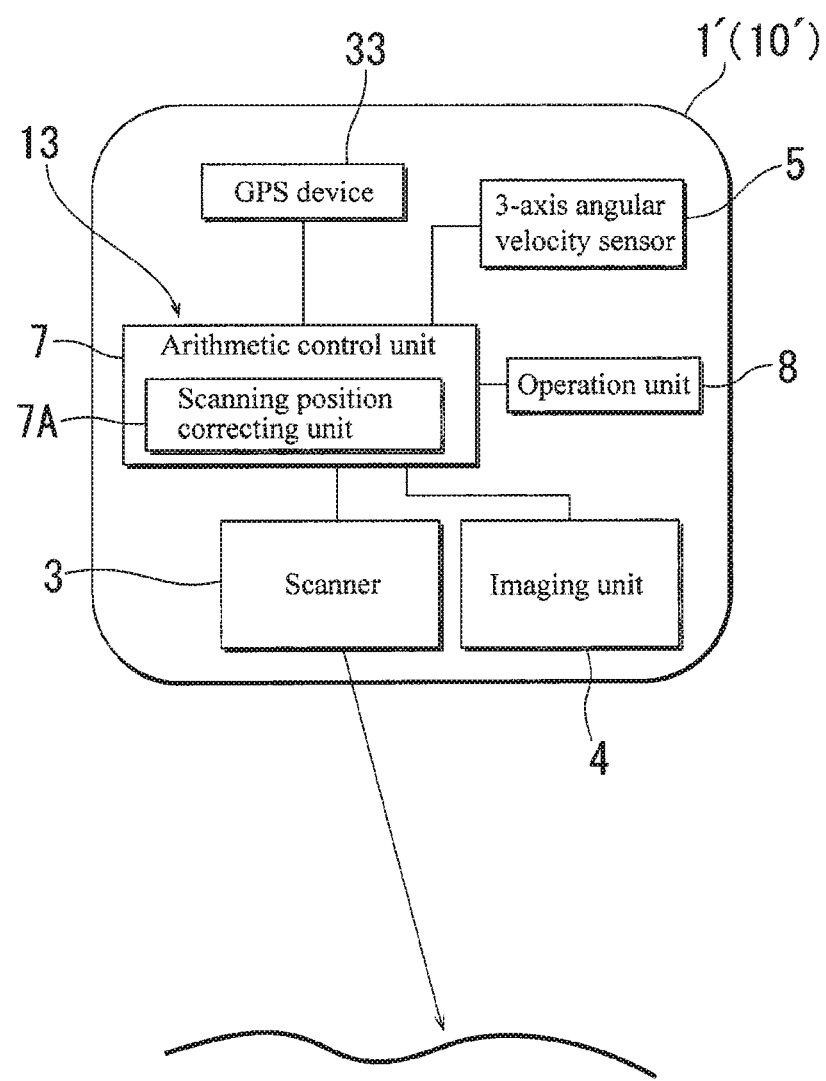
FIG. 8 is a control block diagram of the survey system according to the second embodiment.

FIG. 8 is a control block diagram of the survey system 1'. The arithmetic control unit 7 controls a flying unit not illustrated in the drawings, and acquires three-dimensional coordinate point group data (distances and angles to scanning points) from the scanner 3, acquires positional information (a latitude and a longitude) of the scanner 3 from the GPS device 33, and calculates posture information of the scanner 3 from image data in each photographing acquired by photographing a survey target, etc., by the imaging unit 4 of the posture detecting device 13, and 3-axis posture angles of the scanner 3 at a plurality of times acquired by the 3-axis angular velocity sensor 5. To each of the three-dimensional coordinate point group data and the positional information and posture information of the scanner, at the timing of outputting a light transmission signal of the scanner 3, time information by the GPS device 33 is provided. Based on the time information, the arithmetic control unit 7 records the three-dimensional coordinate point group data obtained by the scanner 3, the positional information of the scanner obtained by the GPS device 33, and the posture information of the scanner obtained by the posture detecting device 13 in association with each other.

The scanning position correcting unit 7A corrects a three-dimensional position obtained by the scanner 3 by a position of the scanner 3 obtained by the GPS device 33 and a posture of the scanner 3 obtained by the posture detecting deice 13. This will be described in detail along with an operation flow described below.

Figure 9:
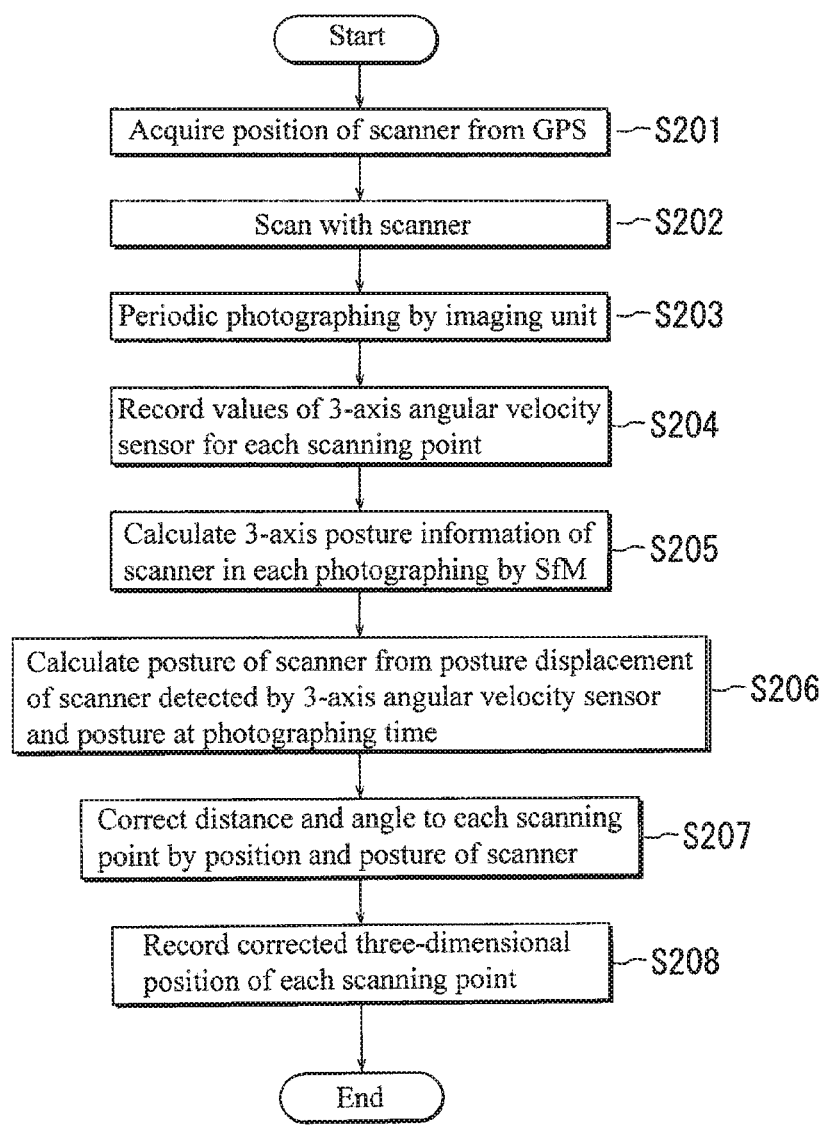
FIG. 9 is an operation flowchart of the survey system according to the second embodiment.

An operation flow of the survey system 1' is described with reference to FIG. 9.

First, in Step S201, the arithmetic control unit 7 of the survey system 1' acquires a three-dimensional position (absolute coordinates) from the GPS device 33. The GPS device 33 and the scanner 3 are integrated together, so that positional information acquired by the GPS device 33 can be regarded as a position of the scanner 3.

Next, in Step S202, in parallel with Step S201, the scanner 3 performs a distance measurement and an angle measurement to measure a three-dimensional position of each scanning point of the survey target.

Next, in Step S203, in parallel with Steps S201 and S202, the imaging unit 4 generates a plurality of image data by performing periodic photography at predetermined intervals.

Next, in Step S204, in parallel with Steps S201 to S203, the 3-axis angular velocity sensor 5 detects 3-axis posture angles (a roll angle, a pitch angle, and a yaw angle) of the scanner 3 for each scanning point.

Next, in Step S205, the arithmetic control unit 7 functioning as the posture detecting device 13 performs image analysis of the plurality of image data obtained from the imaging unit 4 in Step S203 by SfM, etc., and calculates absolute posture information (photographing-time 3-axis posture angles) of the scanner 3 in each photographing by the imaging unit 4.

Next, in Step S206, the arithmetic control unit 7 calculates rotational displacement of the scanner 3 (3-axis posture relative displacement angles obtained by subtracting 3-axis preceding posture angles at the latest photographing time before a predetermined scanning time from 3-axis following posture angles at the scanning time) from the 3-axis posture angles (a roll angle, a pitch angle, and a yaw angle) of the scanner 3 for each scanning point obtained from the 3-axis angular velocity sensor 5 in Step S204, and calculates absolute posture information (3-axis absolute posture angles) of the scanner 3 for each scanning point by adding the calculated 3-axis posture relative displacement angles to the photographing-time 3-axis posture angles.

Next, in Step S207, the positional information of the scanner 3 obtained from the GPS device 33 in Step S201, the three-dimensional coordinate point group data of scanning points obtained from the scanner 3 in Step S202, and the absolute posture information of the scanner 3 obtained by the posture detecting device 13 in Step S206 are associated with each other by time acquired by the GPS device 33. Then, the scanning position correcting unit 7A corrects the three-dimensional position of each scanning point obtained in Step S202 by the positional information and the absolute posture information of the scanner.

Specifically, in Step S201, a position of the scanner 3 is acquired as absolute coordinates by the GPS device 33. In Step S206, an inclination (posture) of the scanner 3 is known. Therefore, the scanning position correcting unit 7A corrects the reference optical axis O of the scanner to a posture direction of the scanner, and re-calculates a distance and an angle to each scanning point measured by the scanner 3 by setting the coordinates obtained by the GPS device 33 as a measurement reference point 3o of the scanner.

Last, in Step S208, the measuring moving device 10' stores the three-dimensional positions (absolute coordinates) of the scanning points corrected in Step S207, and ends the operation.

According to the survey system 1' described above, a product of a three-dimensional measurement can be highly accurately obtained only by the surveying moving device 10' even without installing the surveying instrument 20.

Third Embodiment

Figure 10A:
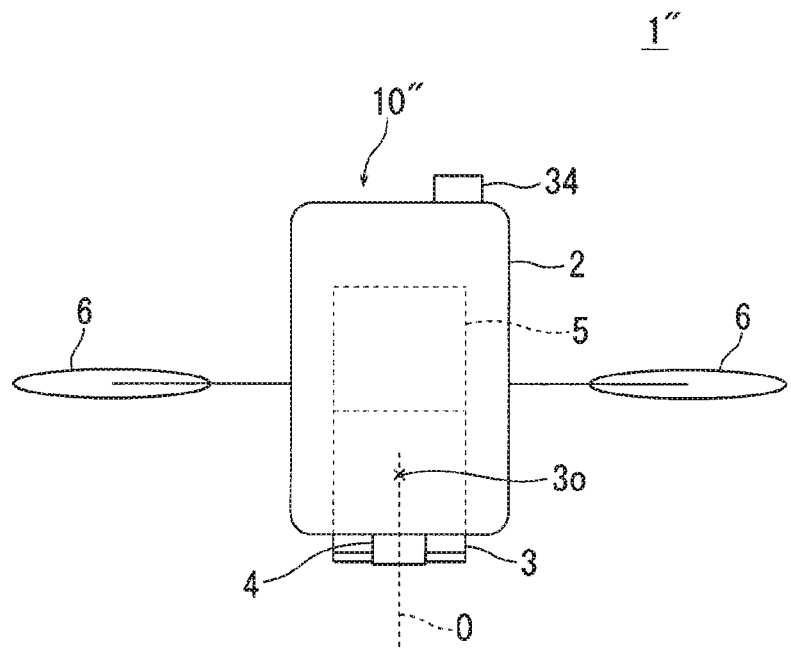
FIGS. 10A and 10B are entire configuration views of a survey system according to a third embodiment.
Figure 10B:
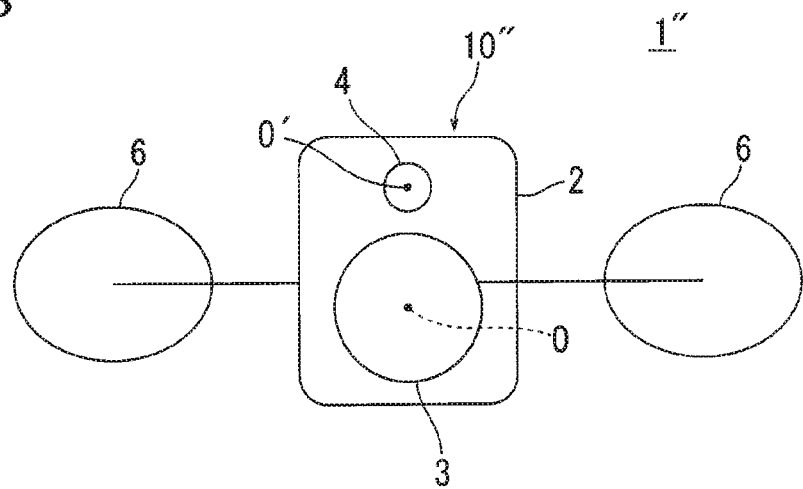

Hereinafter, for the same component as in the first embodiment, the same reference signs are used, and description thereof is omitted. FIG. 10 are configuration views of a survey system 1" according to a third embodiment, FIG. 10A is a side view of the survey system 1", and FIG. 10B is a bottom view of the survey system 1". The survey system 1" consists of a surveying moving device 10" including a mobile body 2, a scanner 3, an imaging unit 4, a 3-axis angular velocity sensor 5, and a GPS time unit 34, and the surveying moving device 10" has the same configuration as that of the surveying moving device 10' illustrated in FIG. 7A and FIG. 7B except that the GPS device 33 is replaced with a GPS time unit 34 capable of acquiring only time information. The survey system 1" is a survey system including, as a position measuring device for the scanner 3, an image analyzer 35 described below in place of the surveying instrument 20 and the GPS device 33.

Figure 11:
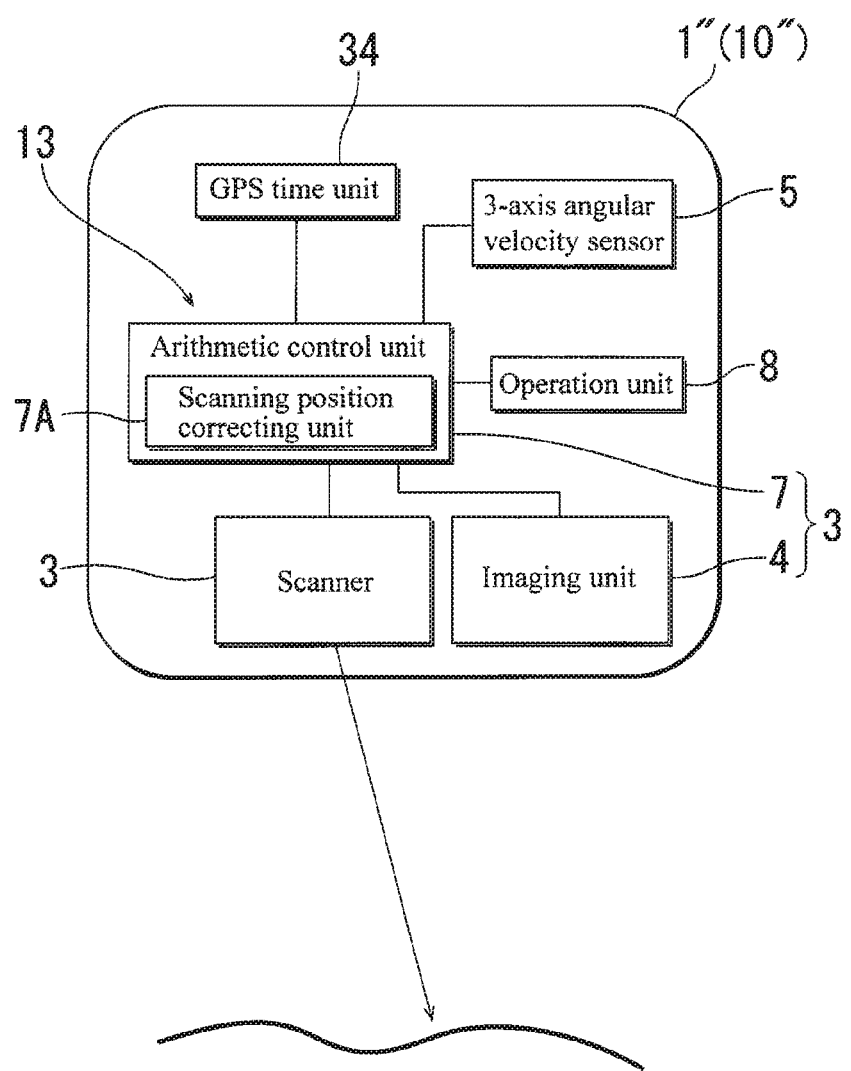
FIG. 11 is a control block diagram of the survey system according to the third embodiment.
Figure 12:
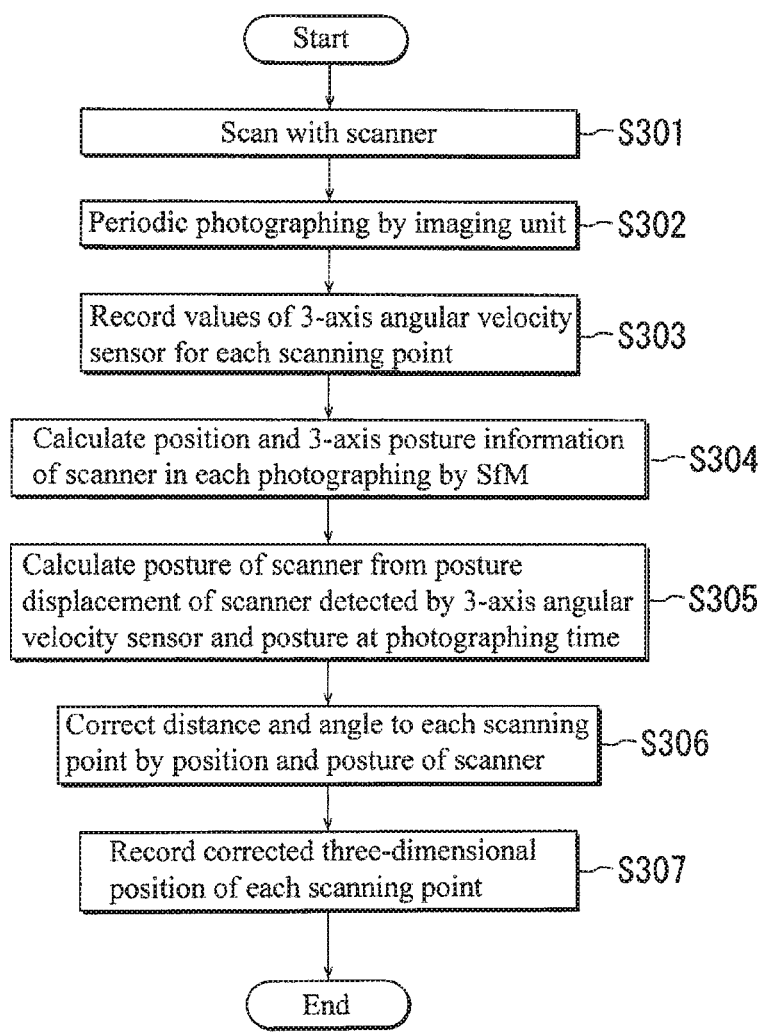
FIG. 12 is an operation flowchart of the survey system according to the third embodiment.

FIG. 11 is a control block diagram of the survey system 1". The image analyzer 35 functions by the imaging unit 4 and the arithmetic control unit 7 that function as a part of the posture detecting device 13. By performing image analysis of image data of a survey target periodically acquired by the imaging unit 4 for image analysis of a posture of the scanner 3 by SfM (Structure from Motion), etc., the arithmetic control unit 7 calculates not only absolute posture information of the scanner 3 in each photographing but also positional information of the scanner 3. The GPS time unit 34 includes a clock that receives a signal from a GPS satellite and generates a UTC and a PPS signal being a constant-frequency pulse. In the image analyzer 35, it is also possible not to use imaging unit 4 of the posture detecting device 13 in common, and a separate imaging unit (camera) that is provided in the mobile body 2 so as to have an optical axis parallel to the imaging optical axis O' and is controlled by the arithmetic control unit 7 may be adopted.

The arithmetic control unit 7 controls a flying unit not illustrated in the drawings, and acquires three-dimensional coordinate point group data (distances and angles to scanning points) from the scanner 3, acquires positional information (a latitude and a longitude) of the scanner 3 by analyzing the image taken by the imaging unit 4, and calculates posture information of the scanner 3 from image data in each photographing acquired by photographing a survey target, etc., by the imaging unit 4 of the posture detecting device 13 and 3-axis posture angles of the scanner 3 at a plurality of times acquired by the 3-axis angular velocity sensor 5. To each of the three-dimensional coordinate point group data and the positional information and posture information of the scanner, at the timing of outputting a light transmission signal of the scanner 3, time information by the GPS time unit 34 is provided. Based on the time information, the arithmetic control unit 7 records the three-dimensional coordinate point group data obtained by the scanner 3, the positional information of the scanner obtained by the GPS time unit 34, and the posture information of the scanner obtained by the posture detecting device 13 in association with each other.

The scanning position correcting unit 7A corrects a three-dimensional position obtained by the scanner 3 by a position of the scanner 3 obtained by the image analyzer 35 and a posture of the scanner 3 obtained by the posture detecting device 13. This will be described in detail along with an operation flow described below.

An operation flow of the survey system 1" is described with reference to FIG. 11.

Next, in Step S301, the scanner 3 performs a distance measurement and an angle measurement to measure three-dimensional positions of scanning points.

Next, in Step S302, in parallel with Step S301, the imaging unit 4 generates a plurality of image data by performing periodic photography at predetermined intervals.

Next, in Step S303, in parallel with Steps S301 and S302, the 3-axis angular velocity sensor 5 detects 3-axis posture angles (a roll angle, a pitch angle, and a yaw angle) of the scanner 3 for each scanning point.

Next, in Step S304, the arithmetic control unit 7 functioning as the posture detecting device 13 and a position measuring device performs image analysis of the plurality of image data obtained from the imaging unit 4 in Step S302 by SfM, etc., and calculates positional information and absolute posture information (photographing-time 3-axis posture angles) of the scanner 3 in each photographing by the imaging unit 4.

Next, in Step S305, the arithmetic control unit 7 calculates rotational displacement of the scanner 3 (3-axis posture relative displacement angles obtained by subtracting, from 3-axis following posture angles at a predetermined scanning time, 3-axis preceding posture angles at the latest photographing time before the scanning time) from the 3-axis posture angles (a roll angle, a pitch angle, and a yaw angle) of the scanner 3 for each scanning point obtained from the 3-axis angular velocity sensor 5 in Step S303, and calculates absolute posture information (3-axis absolute posture angles) of the scanner 3 for each scanning point by adding the calculated 3-axis posture relative displacement angles to the photographing-time 3-axis posture angles.

Next, in step S306, the three-dimensional coordinate point group data of scanning points obtained from the scanner 3 in Step S301, the positional information of the scanner 3 obtained in Step S304, and the absolute posture information of the scanner 3 obtained by the posture detecting device 13 in Step S305 are associated with each other by time acquired in the GPS time unit 34. Then, the scanning position correcting unit 7A corrects the three-dimensional positions of the scanning points obtained in Step S301 by the positional information and the absolute posture information of the scanner.

Specifically, in Step S304, a position of the scanner 3 is acquired as absolute coordinates by the image analyzer 35, and in Step S305, an inclination (posture) of the scanner 3 is known. Therefore, the scanning position correcting unit 7A corrects the reference optical axis O of the scanner to a posture direction of the scanner, and re-calculates a distance and an angle to each scanning point measured by the scanner 3 by setting the coordinates obtained by the image analyzer 35 as a measurement reference point 3o of the scanner.

Last, in Step S307, the surveying moving device 10" stores the three-dimensional positions (absolute coordinates) of the scanning points corrected in Step S306, and ends the operation.

According to the survey system 1" described above, even without installing the surveying instrument 20 or the expensive GPS device 33, a product of a three-dimensional measurement can be highly accurately obtained only by the surveying moving device 10" including the image analyzer 35 that functionally uses in common a part of the posture detecting unit 13.

(Modification 1)

In the first embodiment to the third embodiment, the arithmetic control unit 7 that calculates a posture of the scanner (a posture and a position of the scanner in the third embodiment) and the scanning position correcting unit 7A that corrects a three-dimensional position of each scanning point of a survey target by the position and posture of the scanner are provided in each of the surveying moving devices 10, 10', and 10", however, the operations to be performed by the arithmetic control unit 7 and the scanning position correcting unit 7A may be performed by an information processing terminal (a personal computer or the like) separately connected to the moving device 10, 10', 10" for photographic surveying after operations by the position measuring device (the surveying instrument 20, the GPS device 33, the image analyzer 35), the imaging unit 4, and the 3-axis angular velocity sensor 5.

Specifically, the operation of calculating absolute posture information (3-axis absolute posture angles) of the scanner 3 to be performed in Steps S105, S106, S205, S206, S304, and S305, the operation of calculating positional information of the scanner 3 to be performed in Steps S304, and the operation of correcting the three-dimensional position of each scanning point by a position and posture of the scanner to be performed in Steps S107, S207, and S306, may be performed later by the above-described information terminal.

(Modification 2)

Figure 13:
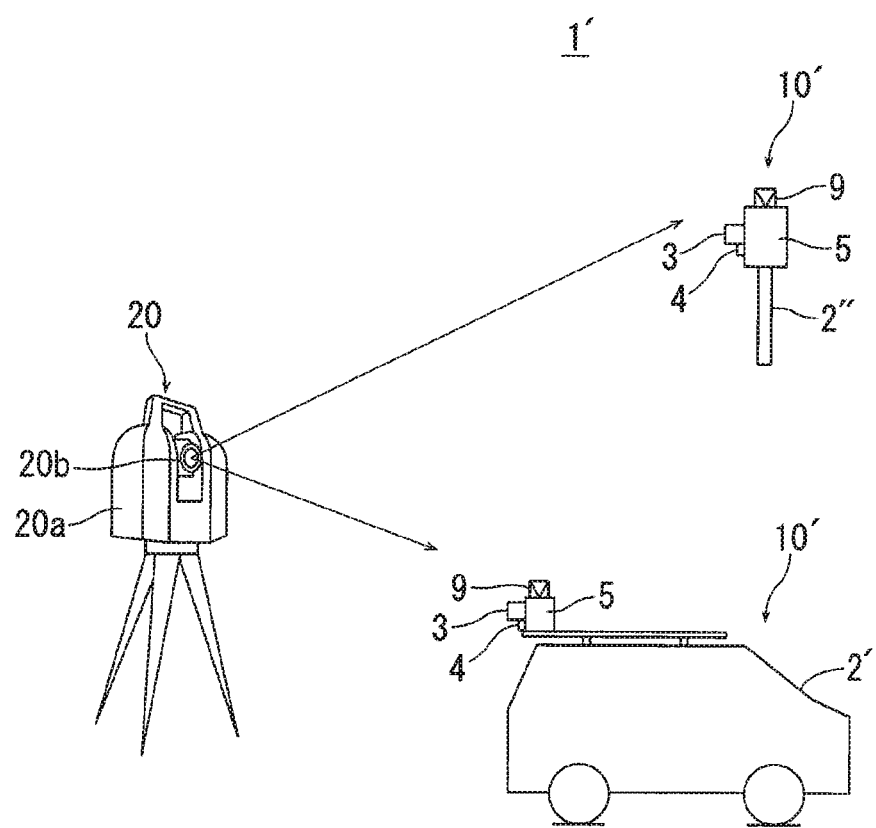
FIG. 13 illustrates a modification of the survey system according to the first embodiment.

In each of the first to third embodiments, the mobile body 2 of the surveying moving device 10 is a UAV, however, the mobile body 2 is only required to be movable in a survey site. An example is shown by using the second embodiment. FIG. 13 is a modification of the survey system 1 according to the first embodiment. The mobile body 2' illustrated in FIG. 13 is a vehicle, and on a roof of the vehicle, a unit in which a scanner 3, an imaging unit 4, a 3-axis angular velocity sensor 5, and a prism 9 are integrated is mounted. The mobile body 2" illustrated in FIG. 13 is a handheld housing, to which a unit in which a scanner 3, an imaging unit 4, a 3-axis angular velocity sensor 5, and a prism 9 are integrated is attached. Even when the mobile body is in such a form, effects equivalent to those of the first embodiment are obtained.

(Modification 3)

In the survey system 1, the timer 12 of the surveying moving device 10 and the timer 32 of the surveying instrument 20 may both be replaced by GPS time units. The GPS time unit has a clock that receives a signal from a GPS satellite and generates a UTC and a PPS signal being a constant-frequency pulse, and provides time information to each of the three-dimensional coordinate point group data and the positional information and posture information of the scanner at the timing of outputting a light transmission signal of the scanner 3.

(Modification 4)

The position measuring device in the survey system 1' of the second embodiment is not limited to the GPS device 33 as long as it is a GNSS device, and may be a GNSS device using GLONASS, Hokuto (Hokuto-2, Compass), Gallileo, or other GNSS systems. The GPS time unit 34 in the third embodiment and the GPS time unit in Modification 3 may also be replaced by GNSS time units that acquire time information by using GLONASS, Hokuto (Hokuto-2, Compass), and Gallileo, etc. The GNSS device receives a signal from a GNSS satellite and acquires a UTC, a latitude, and a longitude, and the GNSS time unit acquires only time information from a GNSS satellite. The acquired time information is provided to the three-dimensional coordinate point group data and the positional information and posture information of the scanner at the timing of outputting a light transmission signal of the scanner 3.

While embodiments and modifications of a preferred survey system of the present invention are described above, each embodiment and each modification can be combined based on knowledge of a person skilled in the art, and such combined modes shall also be included in the scope of the present invention.

REFERENCE SIGNS LIST 1, 1', 1" Survey system
2, 2' Mobile body
3 Scanner
3a Emitting unit
3b Light receiving unit
3c Distance measuring unit
3f, 3g Risley prism (first optical axis deflecting unit)
3h Optical axis of distance measuring light
3h' Distance measuring light
3j, 3k Fresnel prism (second optical axis deflecting unit)
3l Light receiving optical axis of reflected distance measuring light
3l' Reflected distance measuring light
3m Emitting direction detecting unit
4 Imaging unit
5 3-axis angular velocity sensor
7 Arithmetic control unit
9 Prism
10, 10', 10" Surveying moving device
13 Posture detecting device
13 Surveying instrument (position measuring device)
SP0, SP1, SPn Photographing-time 3-axis posture angles of scanner
GP0, GP1, GPn 3-axis preceding posture angles of scanner
G1, G2, Gn 3-axis following posture angle of scanner
Sn 3-axis absolute posture angles (posture information) of scanner

What is claimed is:

1. A survey system comprising:
a mobile body equipped with a scanner configured to scan a survey target by a distance measuring light;
a position measuring device configured to measure a position of the scanner; and
a posture detecting device configured to detect a posture of the scanner,
wherein
the posture detecting device includes an imaging unit configured to acquire image data by periodic photography, a 3-axis gyro sensor configured to detect 3-axis posture angles of the scanner, and an arithmetic control unit, and the arithmetic control unit is configured to calculate posture information of the scanner by summing photographing-time 3-axis posture angles of the scanner acquired in each photographing by image analysis of the image data, and 3-axis posture relative displacement angles of the scanner calculated by subtracting 3-axis preceding posture angles detected by the 3-axis gyro sensor at each photographing time by the imaging unit from 3-axis following posture angles detected by the 3-axis gyro sensor in an interval in which photographing is not performed in the interval by the imaging unit.

2. The survey system according to claim 1, wherein the 3-axis gyro sensor is configured to detect the 3-axis following posture angles at a scanning time of the scanner and detect the 3-axis preceding posture angles at the latest photographing time before the scanning time.

3. The survey system according to claim 1, wherein
the mobile body has a prism, and
the position measuring device is a surveying instrument configured to perform a distance measurement and an angle measurement by tracking the prism.

4. The survey system according to claim 1, wherein the position measuring device is a GNSS device provided in the mobile body.

5. The survey system according to claim 1, wherein the position measuring device is an image analyzer including an imaging unit provided in the mobile body.

6. The survey system according to claim 1, wherein
the scanner includes
a light emitting unit configured to emit a distance measuring light, a light receiving unit configured to receive a reflected distance measuring light, a distance measuring unit configured to perform a distance measurement based on an output of the light receiving unit, a first optical axis deflecting unit located on an optical axis of the distance measuring light and configured to deflect the distance measuring light, a second optical axis deflecting unit located on a light receiving optical axis of the reflected distance measuring light and configured to deflect the reflected distance measuring light at the same deflection angle in the same direction as those of the first optical axis deflecting unit, and an emitting direction detecting unit configured to detect a deflection angle and direction of the first optical axis deflecting unit and the second optical axis deflecting unit.

* * * * *